United States Patent Office 3,786,017
Patented Jan. 15, 1974

3,786,017
YELLOW PIGMENT COMPOSITIONS
Guido R. Genta, Snyder, N.Y., assignor to
American Aniline Products, Inc.
No Drawing. Continuation-in-part of application Ser. No. 826,272, May 20, 1969, now Patent No. 3,635,957.
This application Jan. 14, 1972, Ser. No. 217,928
Int. Cl. C08f 45/14; C08g 51/14
U.S. Cl. 260—38          6 Claims

ABSTRACT OF THE DISCLOSURE

Water-insoluble disperse yellow pigments, particularly suitable as colorants for plastics, are provided. The dyes are made from a benzaldehyde intermediate having as part of its structure a 2-mercaptobenzothiazole or a thiazolinethiol by reacting the benzaldehyde intermediate with an active methylene group compound which contains at least one nitrile as an activating group.

CROSS REFERENCE TO RELATED APPLICATION

This application is a continuation-in-part of my co-pending application Ser. No. 826,272, filed May 20, 1969 now U.S. Pat. 3,635,957.

BACKGROUND OF THE INVENTION

Styryl dyes made from cyano compounds containing an active methylene group, such as malononitrile, are known, such as disclosed in Canadian Pat. 830,505. Although compounds of this type are widely known as dyes for such synthetic fibers as polyesters, polyamides and cellulose acetates, such compounds are generally unsuited for the pigmentation of plastics.

I have discovered a new class of styryl dyes which have excellent fastness properties on plastic substrates.

SUMMARY OF THE INVENTION

In accordance with the invention, there is provided a new class of yellow rigid plastic compositions containing styryl compounds of the formula

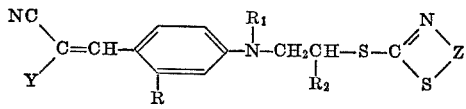

wherein

Y is cyano, carbamoyl, N-lower alkyl carbamoyl, N,N-dilower alkyl carbamoyl, N-phenyl carbamoyl, N-lower alkoxypehnyl carbamoyl, N-lower alkylphenyl carbamoyl, N-halophenylcarbamoyl, lower carbalkoxy, lower cyano carbalkoxy, phenyl sulfonyl, halo phenyl sulfonyl, or lower alkyl phenylsulfonyl;

Z is ethylene, 1,2-propylene, o-phenylene, lower alkyl-o-phenylene, lower alkoxy-o-phenylene, or halo-o-phenylene;

R is hydrogen, lower alkyl or halogen;

$R_1$ is hydrogen, lower alkyl, chloroethyl, chloropropyl, lower alkoxy lower alkyl, or cyanolower alkyl; and $R_2$ is hydrogen or methyl.

DETAILED DESCRIPTION

The compounds of the invention are made by condensing an aldehyde of the formula:

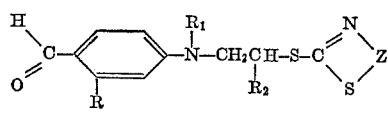

with a nitrile-containing active methylene compound of the formula:

$$Y-CH_2\atop\underset{CN}{|}$$

wherein Y, Z, R, $R_1$ and $R_2$ have the meanings given aforesaid.

The aldehydes used as starting materials in the condensation reaction are prepared by reacting the haloalkyl group of an aldehyde of the formula:

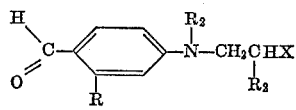

with a 2-mercaptobenzothiazole or with a thiazolinethiol. In the above formula, R, $R_1$ and $R_2$ have the meanings given aforesaid, and X is chlorine or bromine.

Aldehydes useful in preparing the intermediate include:

4-[(2-chloroethyl)ethylamino]-o-tolualdehyde;
4-[(2-chloroethyl)ethylamino]benzaldehyde;
4-[(2-chloro-n-propyl)ethylamino]-o-tolualdehyde;
4-[(2-chloro-n-propyl)ethylamino]benzaldehyde;
4-[(2-bromoethyl)ethylamino]-o-tolualdehyde;
4-[(2-bromo-n-propyl)ethylamino]benzaldehyde;
4-[(2-chloroethyl) (2-cyanoethyl)amino]benzaldehyde;
4-[(2-chloro-n-propyl) (2-cyanoethyl)amino]o-tolualdehyde;
4-[(2-chloroethyl)ethylamino]-o-chlorobenzaldehyde;
4-[(2-chloroethyl)ethylamino]-o-bromobenzaldehyde;
4-[(2-chloroethyl) (2-methoxyethylamino)-o-tolualdehyde; and
4-[(2-chloroethyl) (2-ethoxyethylamino]benzaldehyde.

Useful 2-mercaptobenzothiazoles and thiazolinethiols are those of the formula:

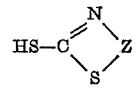

in which Z has the meaning given aforesaid. Particularly suitable are:

2-thiazoline-2-thiol;
5-methyl-2-thiazoline-2-thiol;
4,4-dimethyl-2-thiazoline-2-thiol;
4-ethyl-2-thiazoline-2-thiol;
2-mercaptobenzothiazole;
2-mercapto-5-chlorobenzothiazole;
2-mercapto-4,5-dimethylbenzothiazole;
2-mercapto-4-methoxybenzothiazole;
2-mercapto-4-methylbenzothiazole;
2-mercapto-5-methylbenzothiazole; and
2-mercapto-5-nitrobenzothiazole.

The reaction between the mercaptan and the halogen atom of the intermediate aldehyde is carried out in the presence of a high boiling polar organic solvent; i.e., a solvent having a boiling point of at least 120° C. Useful solvents include n-pentanol, 2-methoxyethanol, 2-ethoxyethanol, n-amyl alcohol, 2-ethoxyethyl acetate, diacetone alcohol, ethylene glycol, benzyl alcohol, diethylene glycol, 2-butoxyethanol, tetrahydrothiophene-1,1-dioxide, N,N-dimethylformamide, N,N-dimethylacetamide, and the like.

The reaction is carried out in the presence of a halogen acceptor, preferably an alkali metal hydroxide, an alkali metal carbonate, or alkali metal acetate. Useful halogen acceptors include potassium hydroxide, sodium hydroxide, sodium carbonate, potassium carbonate, sodium acetate, and the like. At least one equivalent of halogen acceptor is required for each mole of aldehyde intermediate. An excess of halogen acceptor can be used, but no particular advantage is obtained thereby.

The reaction to form the aldehyde used in the subsequent condensation generally takes from 5–10 hours. After the reaction is complete, the mixture is allowed to cool to 30–60° C. and the appropriate nitrile is charged directly to the reaction mixture.

As noted above, useful nitriles are those of the formula:

in which Y is as defined aforesaid. Particularly useful are malononitrile; ethyl cyanoacetate; cyanoethyl cyanoacetate; methyl cyanoacetate; cyanoacetamide; N-methyl cyanoacetamide; cyanoacetanilide; cyanoacet-o-anisidide; cyanoacet-p-toluidide; cyanoacet-(m-chloro)anilide; phenylsulfonylacetonitrile; p-tolylsulfonylacetonitrile; p-chlorosulfonylacetonitrile.

Along with the nitrile, there is charged to the reaction mixture an alcohol, such as ethanol or 2-propanol and a small amount of piperidine to assist in the condensation reaction.

The condensation reaction is run at a temperature of 80–120° C., preferably 100–105° C. After condensation is complete, which generally requires from about one and one-half to four hours, the reaction mass is slowly cooled to below room temperature, preferably 10–15° C. The product dye crystallizes slowly from the reaction mixture at these temperatures. The compound is recovered by filtration and is subsequently washed with an alcohol, such as 2-propanol, followed by cold water.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semirigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified; polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrene-butadiene, are also within the scope of the invention.

Specific examples of thermoplastic resins include polyvinyl chloride, polyvinyl acetate, vinyl chloride-acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

Example I

To a one-liter flask equipped with thermometer, stirrer and reflux condenser, there were charged 150 g. N,N-dimethylformamide, 45 g. 4-[(2-chlorethyl)ethylamino]-o-tolualdehyde, 33.5 g. 2-mercaptobenzothiazole, and 20 g. of anhydrous potassium acetate. The mixture was heated slowly to 140–145° C. using nitrogen to help eliminate the acetic acid formed. Refluxing was continued at 140–145° C. for a period of eight hours. After cooling to room temperature, the solution was clarified and recharged to the original reaction flask.

A 100 g. quantity of 2-propanol was added, followed by the addition of 5 g. piperidine and 16 g. of malononitrile. The resulting mixture was heated to 100–105° C. and was held at this temperature for a period of two hours. It was then cooled slowly to 10–15° C. The compound was formed in crystallized yellow needles. It was filtered and washed first with 100 g. of 2-propanol, followed by cold water. There was thus obtained 65 g. of a compound having a melting point of 195–196° C.

Example II

Methyl methacrylate resin is colored with the compound of Example I as the colorant, in a ratio of 2 grams resin to 1 mg. colorant. The resin is prepared by placing 1 lb. of methyl methacrylate into a Thropp mill (a 2-roller mill), which is then heated and run in order to melt and smash the resin to a molten mass. The compound of Example I is added and the entire mixture of resin and colorant is milled until the colorant is uniformly distributed in the mass as measured by eye. While still hot, 30 grams of the hot mass is cut off for use in the following procedure. The sample, containing 30 grams methyl methacrylate and 15 mg. of the compound of Example I as colorant, may be conveniently molded in a Laboratory 40 Single Acting Watson-Stillman Laboratory Press (Farrell-Birmingham Co. 50-ton press). 30 grams of methyl methacrylate mixture containing 15 mg. of the compound of Example I per pound of methyl methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, then the mold is closed.

The mold is held closed at zero pressure by releasing the hydraulic pressure and maintaining the steam for five minutes. The mold pressure is increased to 10 tons and held for ten minutes, the steam remaining on.

The mold pressure is increased to 15 tons and the steam shut off; the drain is opened and cooling water is added for five minutes. Thereafter the pressure is changed to zero and the mold is opened to extract the resultant plastic chip.

Example III

When the 30 gram mixture of methyl methacrylate and the compound of Example I are replaced by 2 pounds polystyrene, 10.44 grams titanium dioxide and 227 mg. of the compound of Example I, following the procedure of Example II a fast coloration of the polystyrene is obtained.

The compound of Example I may also be used as a colorant to impart a yellow shade to plastics made from polycarbonates. A pigmented plastic material of polycarbonates and the compound of Example I may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions, 454 gms. Lexan 121-R (General Electric) pellets are placed in Bipel one ounce reciprocating screw injection molder. The pellets are tumbled for five minutes on the barrel tumbler. The resin is heated (front zone temperature of 550° F. and rear zone temperature of 500° F.) and chips are produced from the virgin resin until chips of good quality are obtained. When the desired quality of chips are obtained with the clear resin, a fresh batch of Lexan 121-R, containing the compound of Example I in an equivalent amount corresponding to Example II to produce a pigmented plastic material is fed into the injection molder, to produce yellow pigmented chips having excellent fastness characteristics.

Example IV

To a one-liter flask, equipped with thermometer, stirrer, and reflux condenser, there were charged 150 cc. of ethyl amyl ketone (B.P. 156–162° C.), 45 g. 4-[(2-chloroethyl)ethylamino]-o-tolualdehyde, 24 g. 2-mercaptothiazoline, and 20 g. potassium acetate. The mixture was heated slowly to 140–145° C. using nitrogen to help eliminate the acetic acid formed. Refluxing was continued for an additional six hours. After cooling to room temperature, the resulting solution was clarified and recharged to the original reaction flask.

To the clarified mixture was added 100 g. 2-propanol, followed by 5 g. piperidine and 16 g. malononitrile. The mixture was heated to 100–105° C. and held at this temperature for a period of two hours. It was then cooled to 10–15° C., whereupon the compound crystallized in the form of yellow needles. The compound was recovered by filtration and washed with 100 g. of ethanol, followed by cold water. The product had a melting point of 122–125° C. When used as a pigment according to the procedure of Example II, coloration of excellent properties are achieved.

Examples V–XXI

If the procedure of Examples II and III are followed using equivalent amounts of the compounds derived from the reactants listed in the following table, compounds are produced which color methyl methacrylate, polystyrene and polycarbonates according to the procedures of Examples II and III.

TABLE I

| Example | Y | R | R | $R_2$ | Z | Color of resultant plastic |
|---|---|---|---|---|---|---|
| V | $H_2NCO-$ | $CH_3$ | $C_2H_5$ | H | o-Phenylene | Bright greenish yellow. |
| VI | Phenylsulfonyl | $CH_3$ | $C_2H_5$ | H | do | Do. |
| VII | ⌬—NHCO— (with OCH₃) | $CH_3$ | $C_2H_5$ | H | do | Do. |
| VIII | $H_3COOC-$ | $CH_3$ | $C_2H_5$ | H | do | Do. |
| IX | ⌬—NH—CO— | H | $C_2H_5$ | H | 4-chloro-o-phenylene. | Do. |
| X | ⌬—NHC(O)— (with OCH₃) | H | $CH_2CH_2CN$ | H | o-Phenylene | Do. |
| XI | ⌬—$SO_2$ | H | $CH_2CH_2CN$ | H | do | Do. |
| XII | $H_7C_3OOC-$ | H | $CH_3$ | H | do | Do. |
| XIII | NC— | $CH_3$ | $C_2H_5$ | $CH_3$ | 3-methoxy-o-phenylene. | Do. |
| XIV | NC— | Cl | $C_2H_5$ | H | o-Phenylene | Do. |
| XV | NC— | $CH_3$ | $C_2H_5$ | H | do | Do. |
| XVI | $H_5C_2OOC-$ | $CH_3$ | $CH_2CH_2CN$ | H | do | Do. |
| XVII | NC— | $CH_3$ | $C_2H_5$ | H | 1,2-ethylene | Do. |
| XVIII | NC— | $CH_3$ | $C_2H_5$ | H | 1,2-propylene | Do. |
| XIX | NC | H | $CH_3$ | H | 1,2-ethylene | Do. |
| XX | ⌬—N(H)—C(O)— (with OCH₃) | $CH_3$ | $C_2H_5$ | H | 1,2-phenylene | Do. |
| XXI | $(CH_3)_2NC(O)-$ | $CH_3$ | $C_2H_5$ | H | o-Phenylene | Do. |

What is claimed is:
1. A pigmented composition comprising a rigid plastic substrate and from about 0.0001 to about 15% of a coloring agent based upon the weight of said rigid plastic substrate, said coloring agent being a compound selected from the styryl compounds of the formula

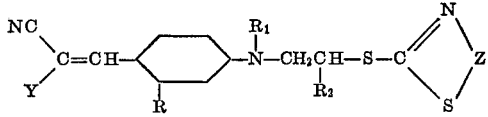

wherein
Y is cyano, carbamoyl, N-lower alkyl carbamoyl, N,N-dilower alkyl carbamoyl, N-phenyl carbamoyl, N-lower alkoxyphenyl carbamoyl, N-lower alkylphenyl carbamoyl, N-halophenyl carbamoyl, lower carbalkoxy, lower cyano carbalkoxy, phenyl sulfonyl, halo phenyl sulfonyl, or lower alkyl phenylsulfonyl;
Z is ethylene, 1,2-propylene, o-phenylene, lower alkyl-o-phenylene, lower alkoxy-o-phenylene, or halo-o-phenylene;
R is hydrogen, lower alkyl or halogen;
$R_1$ is hydrogen, lower alkyl, chloroethyl, chloropropyl, lower alkoxy lower alkyl, or cyanolower alkyl; and
$R_2$ is hydrogen or methyl.

2. The pigmented composition of claim 1 wherein said compound is

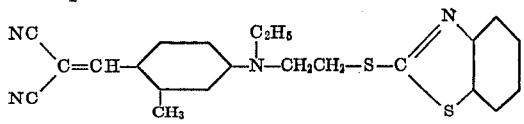

3. The pigmented composition of claim 1 wherein said compound is

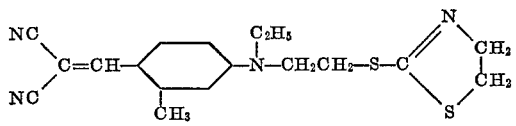

4. The pigmented composition of claim 1 wherein said compound is:

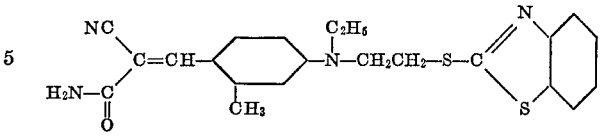

5. The pigmented composition of claim 1 wherein said compound is

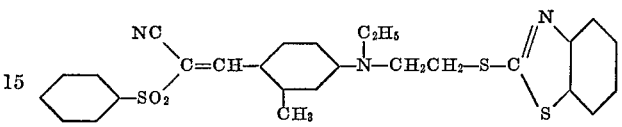

6. The pigmented composition of claim 1 wherein said compound is

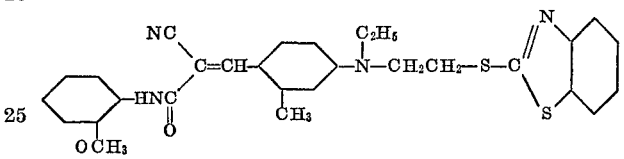

References Cited
UNITED STATES PATENTS
3,635,957  1/1972  Genta _____ 260—306.7
3,316,205  4/1967  Dien _____ 260—41 C MORRIS LIEBMAN, Primary Examiner
P. R. MICHL, Assistant Examiner U.S. Cl. X.R.
260—37 N, 37 EP, 40 R, 41 C